H. E. TRENT.

ELECTRICAL MEASURING INSTRUMENT.

APPLICATION FILED MAR. 9, 1917.

Reissued Apr. 23, 1918.

14,464.

3 SHEETS—SHEET 1.

WITNESSES:

R. D. Brown

J. R. Langley

INVENTOR

Harold E. Trent.

BY J. A. Procter

ATTORNEY

H. E. TRENT.
ELECTRICAL MEASURING INSTRUMENT.
APPLICATION FILED MAR. 9, 1917.
Reissued Apr. 23, 1918.
14,464.
3 SHEETS—SHEET 2.
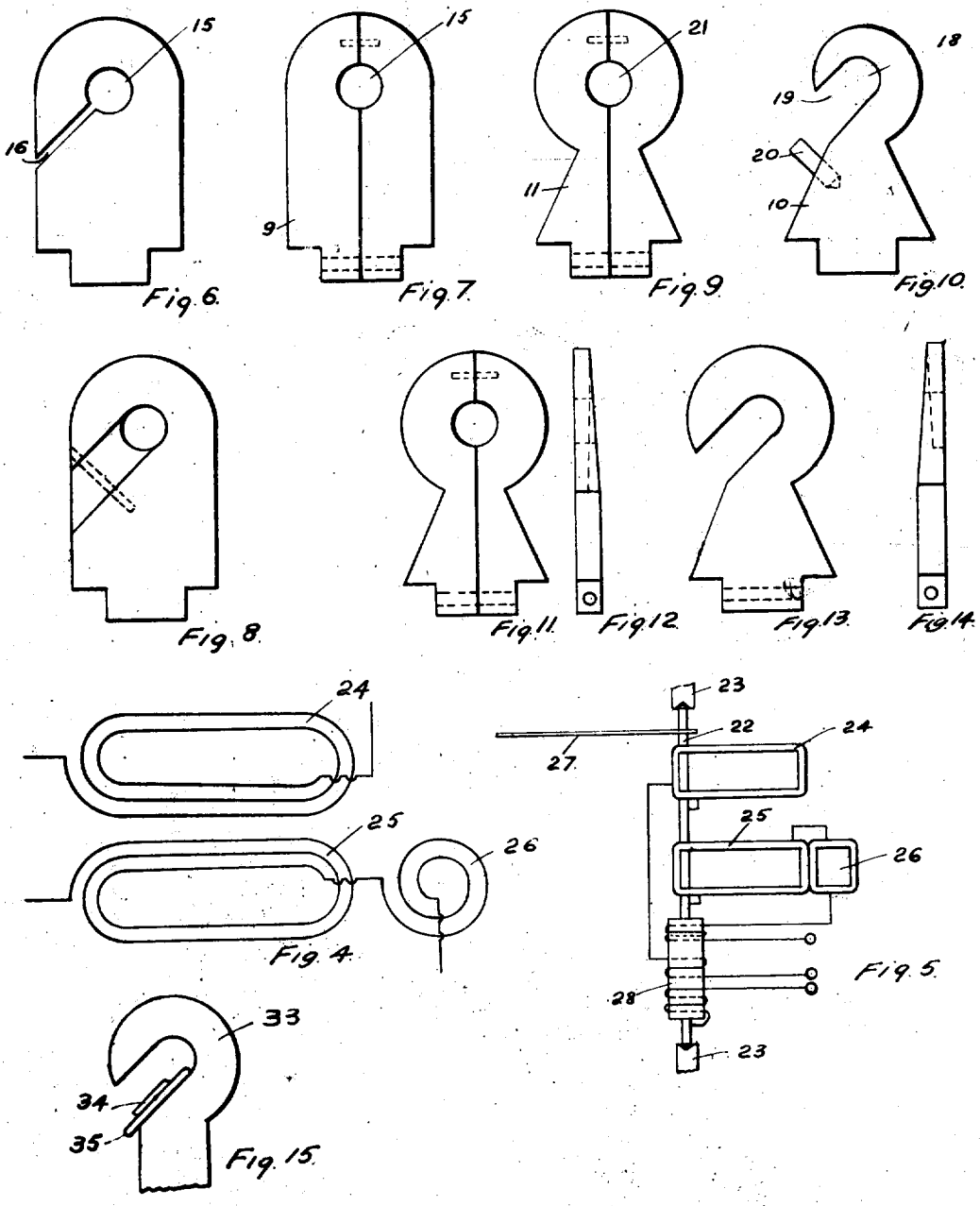
WITNESSES:
R. A. Brown
J. R. Langley
INVENTOR
Harold E. Trent.
BY J. A. Procter
ATTORNEY

H. E. TRENT.

ELECTRICAL MEASURING INSTRUMENT.

APPLICATION FILED MAR. 9, 1917.

Reissued Apr. 23, 1918.

14,464.

3 SHEETS—SHEET 3.

WITNESSES:

R. D. Brown

J. R. Langley

INVENTOR

Harold E. Trent.

BY J. A. Procter

ATTORNEY

UNITED STATES PATENT OFFICE.

HAROLD E. TRENT, OF MURRAYSVILLE, PENNSYLVANIA.

ELECTRICAL MEASURING INSTRUMENT.

14,464. Specification of Reissued Letters Patent. Reissued Apr. 23, 1918.

Original No. 1,171,907, dated February 15, 1916. Serial No. 872,361, filed November 16, 1914. Application for reissue filed March 9, 1917. Serial No. 153,783.

*To all whom it may concern:*

Be it known that I, HAROLD E. TRENT, a subject of the King of Great Britain, and a resident of Murraysville, in the county of Westmoreland and State of Pennsylvania, have invented a new and useful Improvement in Electrical Measuring Instruments, of which the following is a specification.

My invention relates to electrical measuring instruments and it has particular reference to ohmmeters.

One object of my invention is to provide an ohmmeter having a relatively large range of deflection.

Another object of my invention is to provide an electrically controlled moving system for an ohmmeter that has means for increasing its sensitiveness at its initial position to overcome the electromagnetic attraction or freezing action, that is encountered in such instruments having a long scale deflection.

Heretofore, ohmmeters have been provided that had an electrical control instead of a spring control but such instruments were not constructed to insure a long scale of deflection. Long scale instruments of the types heretofore constructed could not be neutralized as there was no provision for neutralizing the torque of the control coil in the initial position when the current traversing the current coil was relatively low.

In order to provide an ohmmeter having a relatively large scale deflection and still cause the same to be accurate over its whole range, I provide a permanent magnet structure that will admit of a relatively large degree of movement of the armature. I further provide the armature with a plurality of windings that coact to effect accurate operation over the whole range of the instrument.

Figure 1:
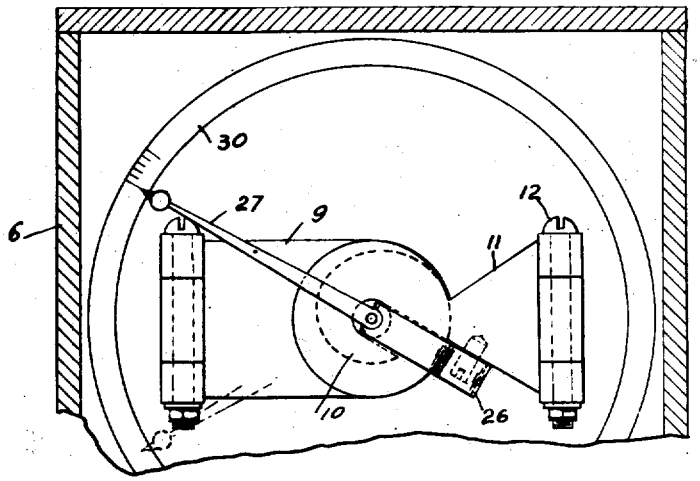
Figure 2:
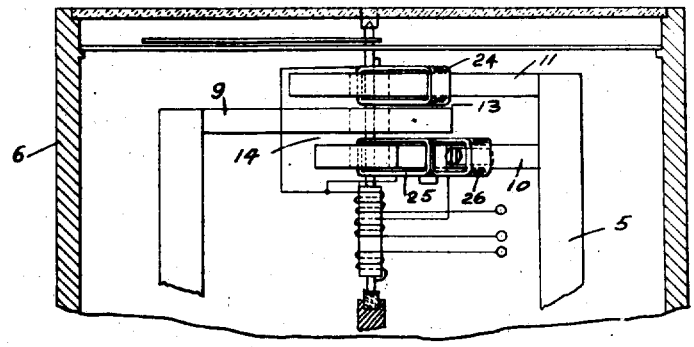
Figure 3:
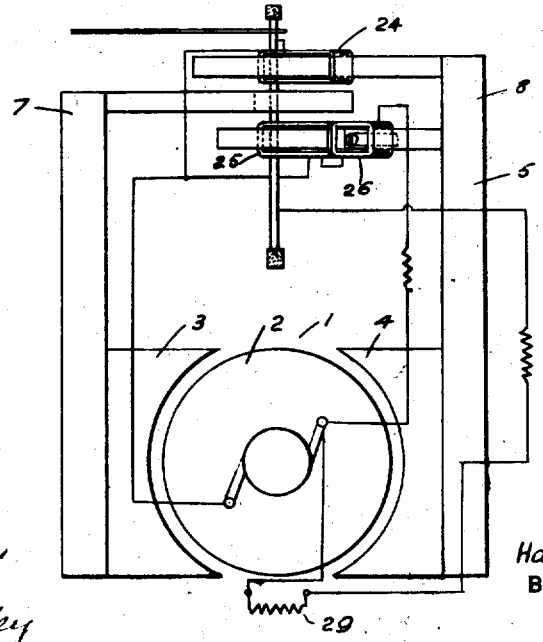
Figure 16:
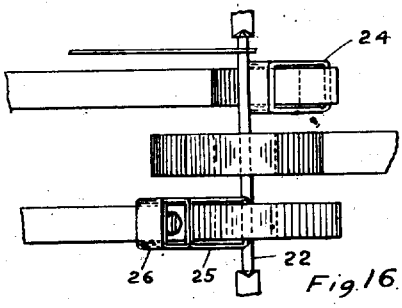
Figure 18:
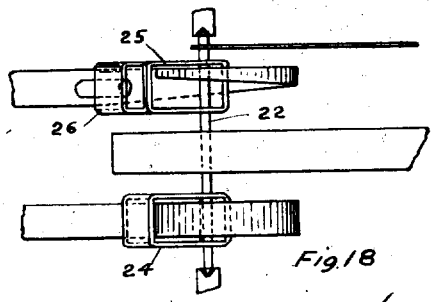
Figure 17:
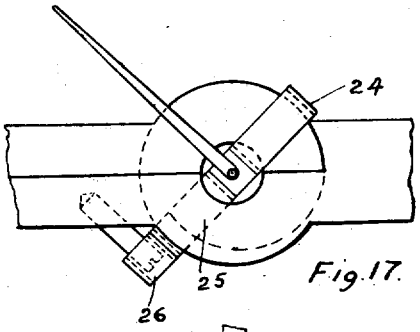
Figure 19:
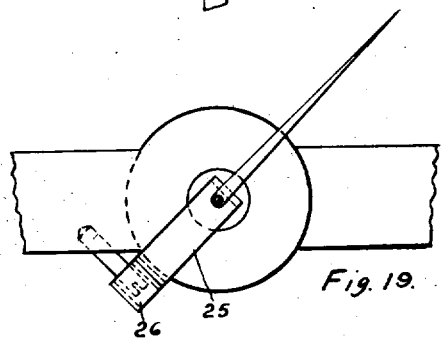
Figure 20:
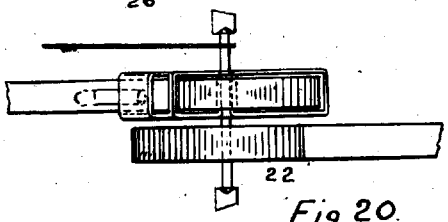
Figure 22:
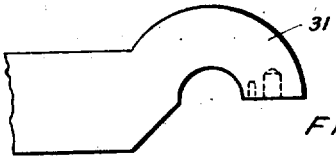
Figure 21:
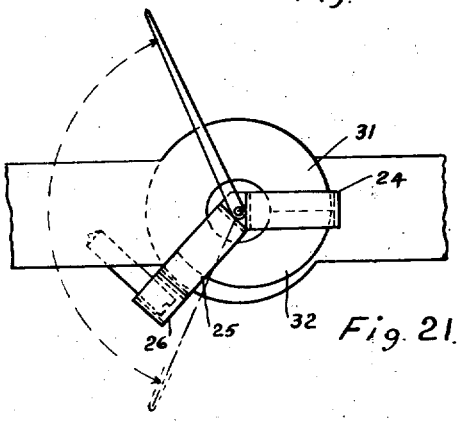
Figure 23:
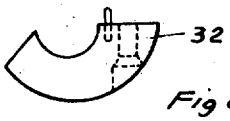

Figure 1 of the accompanying drawings is a fragmental top plan view of an ohmmeter embodying my invention; Fig. 2 is a side view, partially in elevation and partially in section, of the ohmmeter shown in Fig. 1; Fig. 3 is a diagrammatic view of an ohmmeter constructed according to my invention; Fig. 4 is a diagrammatic view of the connections of the armature windings employed in my invention; Fig. 5 is a detailed view of the movable members embodied in my invention; Figs. 6, 7 and 8 are detailed views of various forms of intermediate field magnet pole pieces that may be employed in the ohmmeter shown in Figs. 1 and 2; Fig. 9 is a detailed view of the upper field magnet pole piece embodied in the ohmmeter shown in Figs. 1 and 2; Fig. 10 is a detailed view of the lower field magnet pole piece embodied in the ohmmeter shown in Figs. 1 and 2; Figs. 11 and 12, and 13 and 14 are detailed plan and side elevational views, respectively, of modified forms of upper and lower field magnet pole pieces that may be embodied in my invention; Fig. 15 is another detailed view of a modified form of lower field magnet pole piece; Figs. 16 and 17 are, respectively, side elevational and top plan views of a modified form of my invention; Figs. 18 and 19 are, respectively, side elevational and top views of another modified form of my invention; Figs. 20 and 21 are, respectively, side elevational and top plan views of a still further modified form of my invention; Figs. 22 and 23 are detailed views of the upper pole piece embodied in the modified form of ohmmeter shown in Figs. 20 and 21.

In Figs. 1 to 10, inclusive, of the drawings, a magneto 1 having an armature 2, permanent field magnet pole pieces 3 and 4 and a field magnet yoke 5 is supported in a box or casing 6. The upper ends 7 and 8 of the two arms of the field magnet yoke 5 are cut away and polar projections or field magnet pole pieces 9, 10 and 11 are attached thereto by bolts 12. One arm of the field magnet yoke 5 is relatively longer than the other arm, thus permitting the field magnet pole pieces 9, 10 and 11 to be disposed in side-by-side relation with air gaps 13 and 14 therebetween.

The intermediate field magnet pole piece 9 as shown in Fig. 6 is provided with a circular opening 15 and a slit 16, substantially as shown. However, it may have an opening 15 only and be constructed in two parts with a retaining pin therebetween as shown in Fig. 7 or with an opening 15 and a slit 16 that is closed by a removable member 17, as shown in Fig. 8. The lower field magnet pole piece 10 is of uniform thickness and spiral in shape and it is provided with a circular opening 18, a slit 19 and a polar projection 20 substantially as shown in Fig. 10. However, it may be constructed circular in shape but of varying thickness as shown in Figs. 13 and 14 with a slit 19 therein, the essential features being that the magnetic field therefrom varies for purposes hereinafter more fully set forth. The upper pole piece 11 is composed of two pieces secured together by a pin and is substantially circular in shape. The pole piece 11 is provided with an opening 21 and is of substantially constant cross section. However, it may be of varying cross section as shown in Figs. 11 and 12. A shaft 22 is journaled in jewel bearings 23 and it has mounted thereon an armature comprising a current winding 24, a control voltage winding 25 and a neutralizing or auxiliary winding 26. A pointer 27 and a conductor support 28 are also mounted on the shaft 22. The winding 24 is adapted to surround the pole piece 11 and the winding 25 is adapted to surround the pole piece 10. These windings are connected to oppose each other. The winding 26 is connected in series with the winding 25 but in opposition thereto and it is so disposed that it surrounds the polar projection 20 when the pointer 27 is in its initial position.

The windings 25 and 26 are connected in shunt relation to the armature 2 that is adapted to supply current thereto at a constant potential. Any of the well known methods of driving the armature 2 may be employed to insure a constant potential source of current. The winding 24 is so connected to the terminals of the armature and to the resistor 29, the resistance of which is to be determined, that the same current that traverses the resistor 29 will traverse the winding 24. The pointer 27 is adapted to coöperate with a substantially 300° scale 30 to indicate the resistance of the resistor 29 when the armature 2 is rotated at a constant speed or when it generates a constant potential.

Since the potential of the magneto 1 is assumed to be constant the current that traverses the winding 24 will be inversely proportional to the resistance of the circuit comprising the winding 24 and the resistors connected in series therewith and since the resistance of the circuit exclusive of the resistor 29 is constant it may be assumed that the current that traverses the winding 24 is inversely proportional to the resistance of the resistor 29. Therefore, when the armature 2 is rotated the current that traverses the winding 24 will coact with the field magnet pole pieces 9 and 11 of constant strength and the pointer will move a distance that is proportional to the current. It is understood, however, that the winding 25 is provided to oppose the action of the winding 24 and, it is energized with a constant current and is acted on by a gradually increasing magnetic field, due to the shape of the pole piece 10. Thus, the retarding torque on the movable system is gradually increased to insure accurate control and when no current traverses the resistor 29, or, in other words, when the resistance, to be measured, is infinitely large, the pointer 27 will be returned to its initial position. It will thus be seen that the winding 25, when the potential is constant, is merely a control winding which is provided in lieu of a control spring that is usually employed on electrical measuring instruments. It will be understood that the retarding or controlling action increases as the current in the winding 24 increases substantially the same as the torque of a controlling spring increases. Thus, the controlling action that is gotten by the coaction of the winding 25, that depends upon the potential of the circuit, and the permanent magnets is more sensitive than that which is possible to obtain with a spring and it requires less torque to be developed by the instrument.

The pointer assumes the position shown by the full lines in Fig. 1 when no current traverses the winding 24. If no other means were provided, and, if only a small current traversed the winding 24 on again operating the instrument, the windings would tend to freeze or stick in the initial position. To overcome this tendency, I provide the neutralizing winding 26 that is adapted to surround the polar projection 20 when the windings are in their initial position and I so connect the winding 26 that the field magnet pole piece 10 is sufficiently deenergized to overcome the initial torque of the winding 25 or the effect of the winding 25 is neutralized. Thus, no matter how small a value of current traverses the winding 24, the pointer 27 will move in proportion thereto.

While, in Fig. 5 of the drawing, the windings 24 and 25 are located on the same side of the shaft 22 they may be placed on opposite sides thereof as shown in Figs. 16 and 17 but the range of the instrument will not be as large as is gotten with the former arrangement. When the field magnet pole pieces of the shape shown in Figs. 11 to 14, inclusive, are used, the arrangement of the windings is clearly shown in Figs. 18 and 19 and further description is not believed to be necessary.

Two pole pieces may be employed as shown in the modification in Figs. 20 to 23, inclusive. The lower pole piece may be of a substantially circular shape as shown in Fig. 9 but the upper one comprises two portions 31 and 32, the former of which is of uniform cross section and the latter of variable cross section. The windings 24 and 25 are mounted on the shaft 22 at an angle to each other and the former is adapted to surround the uniform portion 31 and the latter the variable portion 32. Thus, there will be two magnetic fields acting on their respective windings and consequently, the pointer 27 will indicate, in connection with the scale 30, the resistance of the resistor 29 in substantially the same manner as was explained with reference to the modification shown in Figs. 1 to 10, inclusive.

In Fig. 15, the pole piece 33 is substantially spiral in shape and it is provided with a projection 34 upon which is wound a winding 35 that is connected in series with and in opposition to the winding 25. The winding 25 is adapted to engage the winding 35 when the pointer 27 is in its initial position and, thus, if these windings are properly proportioned, the effect is to neutralize the controlling effect of the winding 25 to permit very small currents in the winding 24 to operate the device correctly.

While I have shown my invention in highly desirable and preferred forms, it is not so limited, but is capable of various modifications within the scope of the appended claims.

I claim as my invention:

1. In an electrical measuring instrument, the combination with a stationary permanent magnet and a movable member having an actuating and a controlling winding thereon, of a winding for neutralizing the effect of the said controlling winding only when the movable member is in its initial position.

2. An ohmmeter comprising a permanent field magnet having a pole piece of variable cross sectional area, an armature having a main winding thereon, a controlling winding also associated with the said armature and adapted to coöperate with the pole piece of variable cross sectional area and a third winding for opposing the said controlling winding under predetermined conditions.

3. An electrical measuring instrument comprising a permanent magnet having polar extensions thereon, a movable member having two windings thereon that surround the said polar extensions, and a third winding for neutralizing the effect of one of the said windings under predetermined conditions.

4. An ohmmeter comprising a permanent magnet having polar extensions thereon, a current and a voltage winding surrounding the said polar extensions, a shaft upon which the said windings are disposed and a neutralizing winding adapted to oppose the said voltage winding under predetermined conditions.

5. An ohmmeter comprising a permanent field magnet having pole pieces placed side-by-side, parallel to each other and separated by air gaps, a polar extension on one of the said field magnet pole pieces and means for opposing the magnetic lines of force that traverse the said field magnet pole piece from which extends the polar projection under predetermined conditions.

6. An ohmmeter comprising a permanent field magnet having pole pieces, armature windings surrounding the said field magnet pole pieces, a polar projection on one of the said pole pieces, and means associated with the said armature windings for surrounding and inducing magnetic lines of force in the said polar projection under predetermined conditions.

7. An armature for an ohmmeter comprising a current winding, a voltage winding, said windings adapted to oppose each other, and a neutralizing winding adapted to oppose the said voltage winding only when the armature is in its initial position.

8. An armature for an ohmmeter comprising a current winding, a voltage winding, and a neutralizing winding, said current and voltage windings being adapted to oppose each other, and the said neutralizing winding being attached to the said voltage winding and adapted to oppose the voltage winding when the armature is in its initial position.

9. An ohmmeter comprising a permanent field magnet having pole pieces placed side-by-side and separated by air gaps, a polar projection on one of the said field magnet pole pieces, an armature for the said field magnet pole pieces that is adapted to rotate through an angle substantially larger than 90 degrees, and a winding on the said armature for surrounding the said polar projection when the said armature is in its initial position.

10. An ohmmeter comprising a permanent field magnet having one pole piece of substantially ring form and one of substantially spiral form, a shaft, a current winding and a voltage winding connected to oppose each other and adapted to coöperate with the said ring form pole piece and the said spiral form pole piece, respectively, a neutralizing winding also mounted on the said shaft and a polar projection on the said spiral form pole piece that is adapted to be surrounded by the said neutralizing winding when the said windings are in their initial position.

11. An ohmmeter comprising a permanent field magnet having pole pieces, a movable member having windings thereon, a polar projection on one of the said pole pieces that is surrounded by one of the said windings on the said movable member when it is in its initial position to thereby neutralize the effect of one of the windings.

12. A measuring instrument comprising a permanent field magnet having parallel-disposed substantially annular pole pieces of variable cross-sectional area and of uniform cross-sectional area, and an armature having a main winding thereon for coöperating with the pole piece having uniform cross-sectional area and a controlling winding for coöperating with the pole piece of variable cross-sectional area.

13. A measuring instrument comprising a permanent field magnet having two substantially annular pole pieces of variable and uniform cross-sectional area, respectively, and an armature having a main winding thereon for coöperating with one pole piece and a controlling winding for coöperating with the other pole piece.

14. A measuring instrument comprising a permanent field magnet having two substantially annular pole pieces of variable and uniform cross-sectional area, respectively, and an armature having a main winding thereon for coöperating with the pole piece having uniform cross-sectional area and a controlling winding for coöperating with the other pole piece.

15. An ohmmeter comprising a permanent field magnet having two parallel-disposed substantially annular pole pieces of uniform and variable cross-sectional area, respectively, and an armature having a main winding for coöperating with one pole piece and a controlling winding for coöperating with the other pole piece.

16. A measuring instrument comprising a magnet having two substantially annular pole pieces of uniform and variable cross-sectional area, respectively, and an armature having a main winding for coöperating with the pole piece of uniform cross-sectional area to move the armature in one direction and a controlling winding for coöperating with the other pole piece to develop a gradually increasing torque.

17. An ohmmeter comprising a permanent magnet having two substantially annular pole pieces of constant and variable cross-sectional area, respectively, a rotatable member, a current winding mounted on the rotatable member and adapted to coöperate with the pole piece of constant cross-sectional area, and a potential winding mounted on the rotatable member and adapted to coöperate with the pole piece of variable cross-sectional area, said windings being adapted to oppose each other.

18. An ohmmeter comprising a permanent magnet having two side-by-side pole pieces of substantially ring shape having constant and variable cross-sectional area, respectively, a rotatable member, a current winding mounted on the rotatable member and adapted to coöperate with the pole piece of constant cross-sectional area to turn through an angle substantially greater than ninety degrees, a potential winding mounted on the rotatable member and adapted to oppose the current winding in accordance with its position with respect to the other pole piece.

19. A measuring instrument comprising a permanent magnet having two side-by-side pole pieces of substantially ring shape, one of the pole pieces having substantially constant cross-sectional area and the other having a variable cross-sectional area, a rotatable member, a main winding thereon adapted to coöperate with the pole piece of constant cross-sectional area and a controlling winding on the rotatable member adapted to coöperate with the pole piece of variable cross-sectional area for the purpose of opposing the movement of the main winding with a gradually increasing torque through an angle of movement of substantially greater than ninety degrees.

20. A measuring instrument for an electric circuit comprising a permanent magnet having two side-by-side substantially annular pole pieces one of which is of variable cross-sectional area and the other of which is of constant cross-sectional area, a rotatable member having coöperating windings thereon adapted to coöperate with the pole pieces to indicate the current traversing the electric circuit.

21. A measuring instrument for an electric circuit comprising a permanent magnet having substantially annular side-by-side pole pieces of constant and variable cross-sectional area, respectively, a rotatable member having two windings thereon adapted to coöperate with the pole pieces to indicate electrical conditions in the circuit.

22. A measuring instrument comprising a magnet having two substantially annular pole pieces of uniform and variable cross-sectional area, respectively, a rotatable member, a main winding thereon for coöperating with the pole piece of constant cross-sectional area and a controlling winding on the rotatable member for coöperating with the other pole piece for the purpose of opposing the movement of the main winding with a gradually increasing torque through an angle of movement of substantially greater than ninety degrees.

In testimony whereof, I have hereunto subscribed my name this 7th day of March, 1917.

HAROLD E. TRENT.